United States Patent

Wambeke et al.

[11] Patent Number: 6,150,608
[45] Date of Patent: Nov. 21, 2000

[54] SEAL FOR SEALING AN APERTURE

[75] Inventors: Alain Wambeke, Zoutleeuw; Marc Vanonckelen, Halen; Amandus Pieck, Kortenaken, all of Belgium

[73] Assignee: N.V. Raychem S.A., Kessel-Lo, Belgium

[21] Appl. No.: 09/171,898

[22] PCT Filed: May 1, 1997

[86] PCT No.: PCT/GB97/01194

§ 371 Date: Oct. 28, 1998

§ 102(e) Date: Oct. 28, 1998

[87] PCT Pub. No.: WO97/42693

PCT Pub. Date: Nov. 13, 1997

[30] Foreign Application Priority Data

May 2, 1996 [GB] United Kingdom .................. 9609248
Jul. 12, 1996 [GB] United Kingdom .................. 9614747

[51] Int. Cl.[7] ........................................... H02G 3/18
[52] U.S. Cl. ................ 174/65 G; 174/65 G; 174/135; 16/2.1; 16/2.2; 248/56
[58] Field of Search ............... 174/65 R, 65 SS, 174/65 G, 135, 152 G, 153 G, 151; 16/2.1, 2.2; 248/56

[56] References Cited

U.S. PATENT DOCUMENTS

| | | | |
|---|---|---|---|
| 3,016,562 | 1/1962 | Reid | 16/2.1 |
| 3,182,119 | 5/1965 | Millard | 174/151 |
| 3,518,359 | 6/1970 | Trimble et al. | 174/153 G |
| 3,836,269 | 9/1974 | Koscik | 403/197 |
| 5,007,701 | 4/1991 | Roberts | 350/96.2 |
| 5,069,586 | 12/1991 | Casey | 411/339 |
| 5,235,138 | 8/1993 | Shah et al. | 174/151 |
| 5,434,360 | 7/1995 | Ehrenfels | 174/65 R |
| 5,510,577 | 4/1996 | Corrigan | 174/74 R |
| 5,763,833 | 6/1998 | Bawa et al. | 174/65 SS |

FOREIGN PATENT DOCUMENTS

| | | | |
|---|---|---|---|
| 0 309 895 | 4/1989 | European Pat. Off. | H01B 17/30 |
| 0 355 270 | 2/1990 | European Pat. Off. | F16L 5/02 |
| 0 638 975 | 2/1995 | European Pat. Off. | |

*Primary Examiner*—Dean A. Reichard
*Assistant Examiner*—Dhiru R Patel
*Attorney, Agent, or Firm*—Allen, Dyer, Doppelt, Milbrath, & Gilchrist, P.A.

[57] ABSTRACT

A seal for sealing an aperture in an object, through which aperture one or more elongate article(s) extend(s). The seal includes at least two pressure members; at least two seal members to seal the aperture, at least part of at least one of which is situated, in use, between the at least two pressure members; and a compression device to compress the seal members in use by moving the pressure members closer together. The seal is arranged such that each elongate article extends in between at least two seal members, the seal members being situated adjacent to each other in a lateral direction with respect to the direction in which the elongate article(s) extend(s), and being arranged to form a sealing contact with each other and with each elongate article when they are compressed by the compression device.

37 Claims, 6 Drawing Sheets

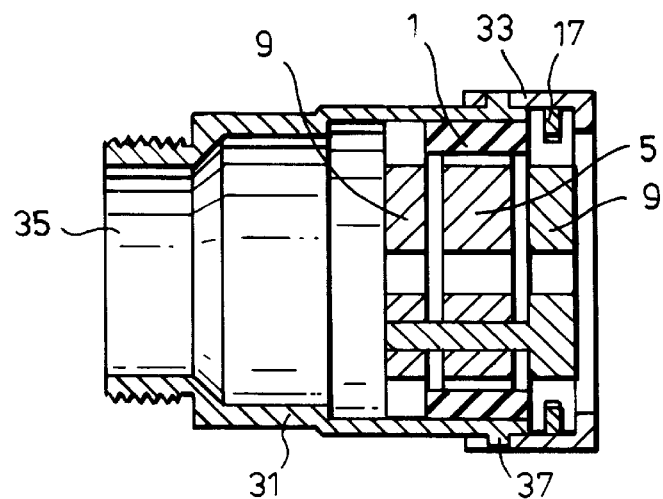
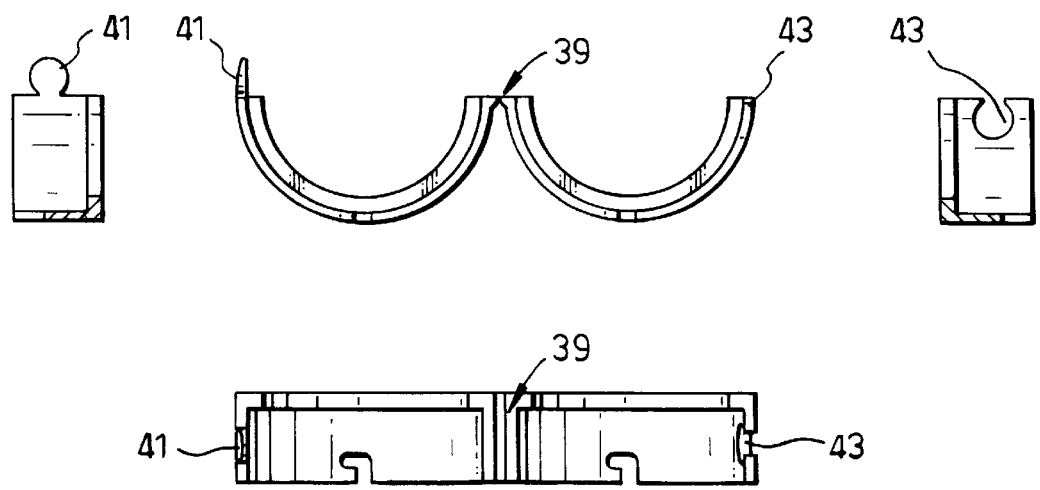

SEAL FOR SEALING AN APERTURE

FIELD OF THE INVENTION

The present invention relates to a seal for sealing an aperture in an object, through which aperture one or more elongate article(s) extend(s). The elongate articles may, for example, be cables (optical fibre cables or electrical conductor cables), optical fibres (including "ruggedized" optical fibres such as patch cords or pigtails), or electrical conductors (e.g. wires). The seal may also be used with pipes, tubes, or the like. The invention also relates to a closed container for containing one or more optical fibre or electrical conductor splices or connections, the container including, in a wall thereof, at least one such seal. The invention also relates to a method of sealing an aperture in an object.

BACKGROUND OF THE INVENTION

U.S. Pat. No. 4,267,401 discloses a seal plug for conduits, the seal plug having a plug core including at least one radially-expansible seal member for sealing the conduit in which it is disposed, while permitting passage of cables or the like therethrough. Until required for the cable or cables, the passages in the seal plug are closed by removable pin inserts, retainer means being provided to hold the inserts in place. The plug includes longitudinal compression means to bring the seal member into sealing contact with the conduit wall. Each passage may open to the circumference of the respective seal member via slits to permit sideways insertion of the cable therein.

The inventors of the present invention have now developed a new seal which has a simpler construction, which is easier to install, and which provides at least as good, and preferably better, sealing performance than the seal plug of U.S. Pat. No. 4,267,401. The new seal of the invention may preferably also be used to seal a greater number of elongate articles than the seal plug of U.S. Pat. No. 4,267,401.

SUMMARY OF THE INVENTION

According to a first aspect, the invention provides a seal for sealing an aperture in an object, through which aperture one or more elongate article(s) extend(s), comprising:

(a) at least two pressure members;

(b) at least two seal members to seal the aperture, at least part of at least one of which is situated, in use, between at least two said pressure members; and (c) compression means to compress the seal members in use by moving said pressure members closer together;

whereby the seal is arranged such that, in use, the or each elongate article extends in between at least two said seal members, the seal members being situated adjacent to each other in a lateral direction with respect to the direction in which the elongate article(s) extend(s), and being arranged to form a sealing contact with each other and with the or each elongate article when they are compressed by the compression means.

The two or more seal members are each preferably discrete, separate, parts which are brought together in use. In some embodiments, however, the seal members (or at least two seal members) may be joined together (including joined by being formed as a single integral part). For example, one or more webs or other joining pieces may join the seal members.

Examples of some of the types of elongate articles with which the seal of the invention may be used were mentioned above. The seal may be used, for example, as a duct seal (i.e. for blocking off and sealing the interior of the duct). It may also be used as a grommet or so-called "feedthrough" in a wall, e.g. a bulkhead. The seal may, for example be used as a feedthrough in a car or other vehicle (it may also be used in ships, aeroplanes, etc.). One specific use, for example, may be as a feedthrough in a bulkhead between the engine compartment and the passenger compartment of a car or other vehicle. However, the intended initial use of the seal by the applicant is in a closed container for containing optical fibre or electrical splices or connections or the like. The container may, for example, be a box or other enclosure, e.g. a so-called "splice case". The container may enclose one or more optical fibre organizer(s), for example.

According to a second aspect therefore, the invention provides a closed container for containing one or more optical fibre or electrical conductor splices or connections, the container including, in a wall thereof, at least one seal according to the first aspect of the invention. The container may be supplied with the seal(s) preinstalled, but preferably it will be supplied with the seal(s) as one or more separate items to be installed when used. The aperture(s) may be present in the container as supplied or may be made only at the time of installation. For example, the wall(s) of the container may have one or more removable portions which may be removed (e.g. by cutting) to provide the required aperture(s).

The seal has the advantage that, because the elongate article(s) extend(s) in between at least two seal members which are situated adjacent to each other in a lateral direction with respect to the direction in which the elongate article(s) extend(s), and which form a sealing contact with each other and with the elongate article(s) when they are compressed by the compression means, the necessity of using pin inserts or other plugs (as required in the seal plug of U.S. Pat. No. 4,267,401 for example) is avoided. Instead, due to the novel and inventive construction of the seal according to the invention, for substantially any number of elongate articles ranging from zero (i.e. no elongate articles) to the maximum number of articles suitable for each particular seal, a tight seal may normally be obtained simply by compressing the seal members, i.e. by moving the pressure members closer together by means of the compression means. Thus, an aperture may normally be sealed in this simple manner whether it has 0, or 1, 2, 3, 4, etc. (up to the maximum required) elongate articles extending through it. The maximum number of elongate articles which a particularly preferred seal according to the invention can accommodate is 24. This seal may, for example, accommodate up to 24 optical fibres (especially "ruggedized" optical fibres, e.g. pigtails or patch cords). Other seals may, of course accommodate different maximum numbers of elongate articles (e.g. 6, 8, 10, 12, 20, 30, 40, 48).

According to a preferred embodiment of the invention, the seal members comprise:

(i) at least one outer seal member which, in use, is situated in the periphery of the aperture to form a sealing contact with the object; and (ii) at least one inner seal member which, in use, is situated laterally (e.g. radially) within the outer seal member.

Preferably, the or each outer seal member is, or the outer seal members in combination are, in the shape of a substantially circular or oval ring. The or each inner seal member preferably has, or the inner seal members in combination preferably have, a substantially circular or oval lateral periphery. Most preferably, the seal may have a single annular outer seal member (e.g. an O-ring) and one or two inner seal member(s) e.g. in the shape of a disc or ring (or there may be at least two semi-circular inner seal members, for example). For example, there may be a single inner seal member, or alternatively there may be at least two (preferably only two) inner seal members, each of which may advantageously be attached to a respective pressure member. In embodiments in which there are two or more inner seal members, they are preferably longitudinally (with respect to the elongate article(s)) adjacent to each other in use, and have the combined effect of a single, larger (in the longitudinal direction) inner seal member.

The internal diameter of the outer seal member(s) is preferably at least as great as, and no more than 5 mm, preferably no more than 3 mm, greater than, the external diameter of the inner seal member(s), when the seal members are in a relaxed, undeformed, state.

The or each outer seal member preferably has at least one groove or other locating means in its external lateral periphery, to locate the outer seal member in the aperture. The groove may, for example, be generally U-shaped or V-shaped in cross-section.

At least one, and preferably each, pressure member of the seal preferably has one or more openings therein, through which, in use, the elongate article(s) extend(s). The one or more openings preferably comprise one or more slots into which, in use, the elongate article(s) may be inserted. The or each slot is preferably open to, and extends from, the lateral periphery of the pressure member. Advantageously, at least one of the pressure members, preferably each pressure member, may further comprise a retaining member which is attachable to the outer lateral periphery of the pressure member to close the slot(s) and thereby to retain one or more elongate article(s) inserted into the slot(s). This preferred aspect of the invention is believed to be novel and inventive in its own right.

Accordingly a third aspect of the invention provides a seal for sealing an aperture in an object, through which aperture one or more elongate article(s) extend(s), comprising:

(a) at least two pressure members, at least one of which contains one or more slots into which, in use, the elongate article(s) may be inserted, the or each slot being open to, and extending from, the outer lateral periphery of the pressure member;

(b) at least one seal member to seal the aperture, at least part of which is situated, in use, between at least two said pressure members;

(c) compression means to compress the seal member(s) in use by moving said pressure members closer together; and (d) at least one retaining member, which is attachable to the outer lateral periphery of a said pressure member containing one or more slot(s), to close the slot(s) and thereby to retain the one or more elongate article(s) inserted into the slot(s).

The seal preferably includes at least two pressure members, each of which contains such slots. Preferably the seal also includes at least two retaining members, each of which is attacheable to the outer lateral periphery of a respective pressure member.

In preferred embodiments of both the third and the first aspects of the invention, each pressure member has a substantially circular outer lateral periphery, and each retaining member preferably has a substantially circular inner lateral periphery. Each retaining member preferably includes a slit, through which, in use, at least one said elongate article may be passed in order to insert the elongate article into a said slot in the pressure member to which the retaining member is attached, the retaining member preferably being movable, e.g. slidable, with respect to the pressure member such that the slit may be positioned adjacent to each of a plurality of said slots in turn, thereby to allow a plurality of such insertions in turn. This has the advantage that each elongate article may be inserted into, and retained within, its respective slot in turn. Accidental displacement of an elongate article from its correct slot during the installation of the seal is thereby substantially prevented.

Each retaining member preferably has a substantially annular shape. Most preferably, they each comprise a split ring.

The slit in each retaining member is preferably no wider than the width(s) of the slot(s) in the pressure member. The retaining members are preferably resiliently flexible, and so the slit in each retaining member can preferably be opened (preferably by hand) in order to pass (or to help pass) an elongate article through it and into a slot in the pressure member. The slit may advantageously be bevelled in order to facilitate such resilient opening of the slit as an elongate article is passed through it. The retaining members may, in some embodiments, be spring-loaded, e.g. resiliently biased against the pressure members.

Each retaining member is preferably attachable to its respective pressure member by location in at least one groove in, and/or on at least one protrusion on, the outer lateral periphery of the pressure member. Each retaining member may advantageously contribute to the compression of at least one of the seal members, preferably at least one outer seal member, by acting as a lateral extension of the pressure member to which the retaining member is attached. This may have the advantage of providing a substantially uniform compression force to the outer seal member.

According to a fourth aspect, the invention provides a method of sealing an aperture in an object, through which aperture one or more elongate article(s) extend(s), by means of a seal according to preferred embodiments of the first or third aspects of the invention, comprising:

(a) inserting the or each elongate article into a respective slot in at least one, preferably in each, pressure member;

(b) inserting the seal member(s) in the aperture; and (c) compressing the seal members between the pressure members by moving the pressure members closer together by means of the compression means.

Step (b) may be performed before step (a), but preferably step (a) is performed before step (b), which is performed before step (c).

Step (a) preferably further includes retaining the or each elongate article in its respective slot in the pressure member (s) by means of a retaining member attached to the outer lateral periphery of the or each pressure member. Advantageously, this step may comprise positioning the slit of the retaining member adjacent to a slot, passing the or each elongate article through the slit and inserting it into the slot, and moving, e.g. sliding, the retaining member with respect to the pressure member in order to move the slit away from the slot. Preferably, a plurality of elongate articles are inserted and retained in each pressure member, and the method further comprises repeating step (a) for each elongate article in turn.

The compression means of the seal according to the invention preferably comprises at least one connecting member which extends between, and interconnects, the pressure members. The compression means preferably comprises a single axially central connecting member. The connecting member(s) may advantageously be screw-threaded (e.g. a bolt), with a screw-threaded tightening member (e.g. a nut, especially a wing nut or the like) screwed thereon. Any of several different types of compression means may be used, however, including snap-fit systems and "twist-and-lock" systems. The compression means may include resilient means (e.g. one or more springs or the like) to apply biased compression to the seal members.

The seal members of the seal according to the invention may be formed from any one or more of a variety of sealing materials. Elastomers, including natural or synthetic rubbers, e.g. EPDM rubber or silicone rubber, are preferred. One particularly preferred sealing material is polymeric foam (open cell or closed cell), especially silicone foam (e.g. silicone rubber foam). Additionally or alternatively, the seal members may be formed from a gel sealing material. The or each seal member may, for example, comprise gel and another material, e.g. an elastomer. The gel may, for example, comprise silicone gel, urea gel, urethane gel, thermoplastic gel, or any suitable gel or gelloid sealing material. Gels are normally substantially incompressible; when placed under a compressive force (e.g. between the pressure members of the seal according to the invention) they normally flow and conform to their surroundings, and form a sealed contact with other surfaces. Preferred gels comprise oil-extended polymers. The polymer may, for example, comprise an elastomer, or a block copolymer having relatively hard blocks and relatively elastomeric blocks. Examples of such copolymers include styrene-butadiene or styrene-isoprene diblock or triblock copolymers, e.g. as disclosed in international patent application WO88/00603 (the entire disclosure of which is incorporated herein by reference). More preferably, however, the polymer of the gel may comprise one or more styrene-ethylene-propylene-styrene block copolymers. The extender oils used in preferred gels may, for example, be hydrocarbon oils, e.g. paraffinic or naphthenic oils or polypropene oils, or mixtures thereof. The gel may also contain additives, e.g. moisture scavengers (such as Benzoyl Chloride), antioxidants, pigments and/or fungicides.

The sealing material or materials of the seal members preferably have a Shore A hardness of no greater than 40, e.g. in the range 5 to 40, especially 10 to 30, e.g. 15. Additionally or alternatively, the sealing material(s) preferably has/have a compression set of no greater than 50%, more preferably no greater than 40%, most preferably no greater than 35%, e.g. 25%. This compression set is preferably as measured according to ISO 815, i.e. 50% compression strain at 70° C. for 22 hours, measured after a recovery time of 30 minutes.

The pressure members and (where present) the retaining members are preferably formed from one or more plastics materials, e.g. polypropylene, polyamide, polycarbonate, acrylobutadiene-styrene (ABS) or the like. Additionally or alternatively they may be formed from one or more metals, e.g. aluminium or steel.

BRIEF DESCRIPTION OF THE DRAWINGS

The invention will now be described, by way of example, with reference to the accompanying drawings, of which:

FIG. 6 is a cross-sectional view of another type of seal according to the invention; and FIG. 7 shows four views of one of the housing parts of the seal shown in FIG. 6.

DETAILED DESCRIPTION OF THE PREFERRED EMBODIMENTS

Figure 1E:
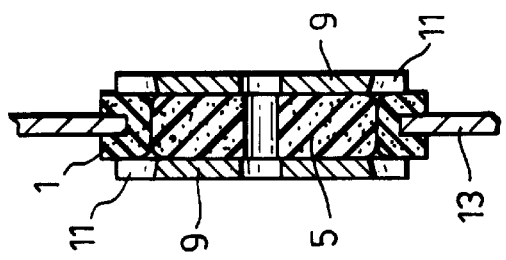
FIG. 1 shows some of the main components of one type of seal according to the invention.

FIG. 1 (views a to d) shows some of the main components of one type of seal according to the invention. FIG. 1a shows a cross-section of an outer seal member 1, comprising an annular seal having a groove 3 in its external lateral (with respect of its axis) periphery. FIG. 1b shows a cross-section of an inner seal member 5, in the shape of a disc, and having an axial hole 7 through it, for an elongate connecting member (not shown). FIG. 1c shows cross-sectional and end views of a pressure member 9. The pressure member 9 is in the form of a disc-shaped plate, and has a plurality (twenty-four, as illustrated) of slots 11, each of which is open to, and extends from, the outer lateral periphery of the pressure member 9. The pressure member 9 also has an axial hole 10, through which, in use, an elongate connecting member (not shown) extends.

Figure 1D:
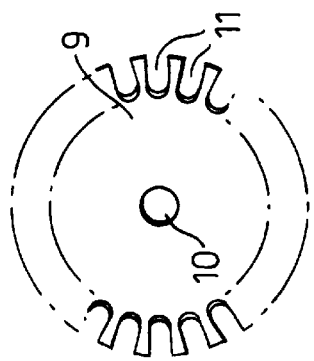
Figure 1C:
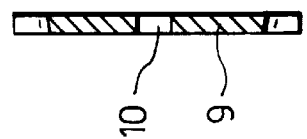
Figure 1B:
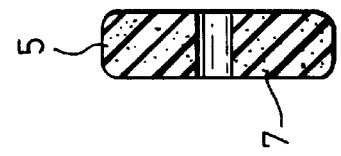
Figure 1A:
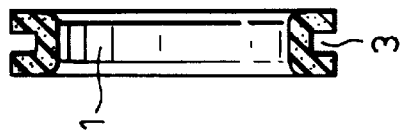

As can be seen in the cross-sectional view of FIG. 1c, the closed end of each slot 11 is not perpendicular to the plane of the pressure member 9, but is inclined to the perpendicular (by 11°, as illustrated). This can aid the sealing around an elongate article (not shown), since it has the effect of directing the article radially inwards towards the inner seal member 5. This effect is illustrated by the dashed lines of FIG. 1d.

FIG. 1d illustrates an installed seal assembled from the components shown in views a, b, and c (with two pressure members 9), but with the elongate connecting member which would extend through the holes 10 in the pressure members 9, and the hole 7 in the inner seal member 5, not shown, in the interest of clarity. In the assembled and installed seal, the annular outer seal member 1 has been inserted into the periphery of an aperture in a wall 13, in such a way that the wall 13 around the aperture periphery is located in the groove 3. The inner seal member 5 is situated laterally within the annular outer seal member 1, between the two pressure members 9. In use, the two seal members 1, 5, would be compressed between the two pressure members 9 by moving the two pressure members closer together by means of an axial connecting member compression means.

Figure 2A:
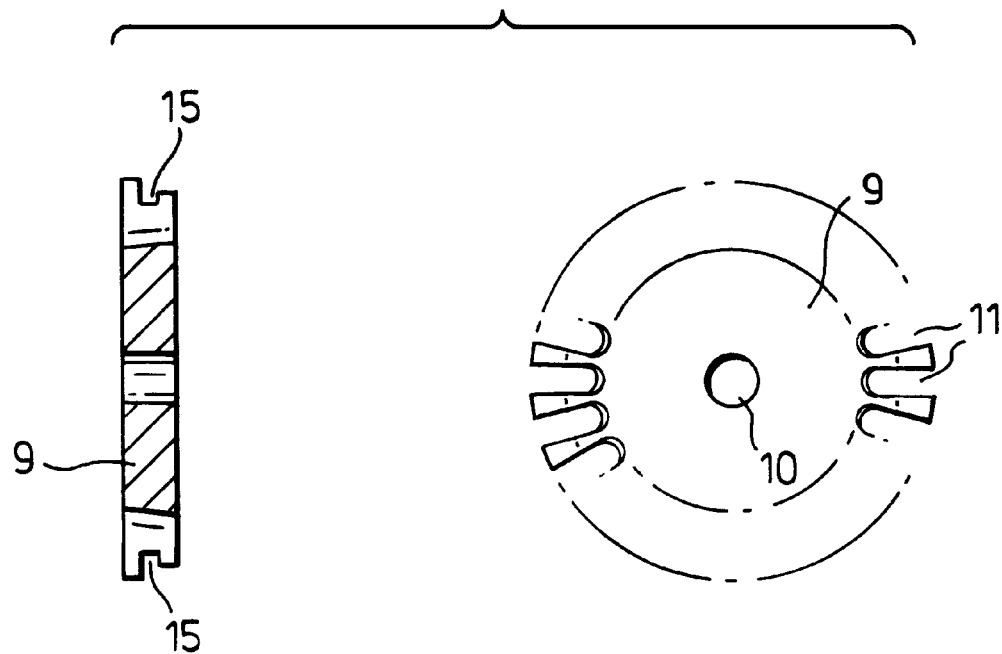
FIG. 2 shows a pressure member and a retaining member of another type of seal according the invention.
Figure 2B:
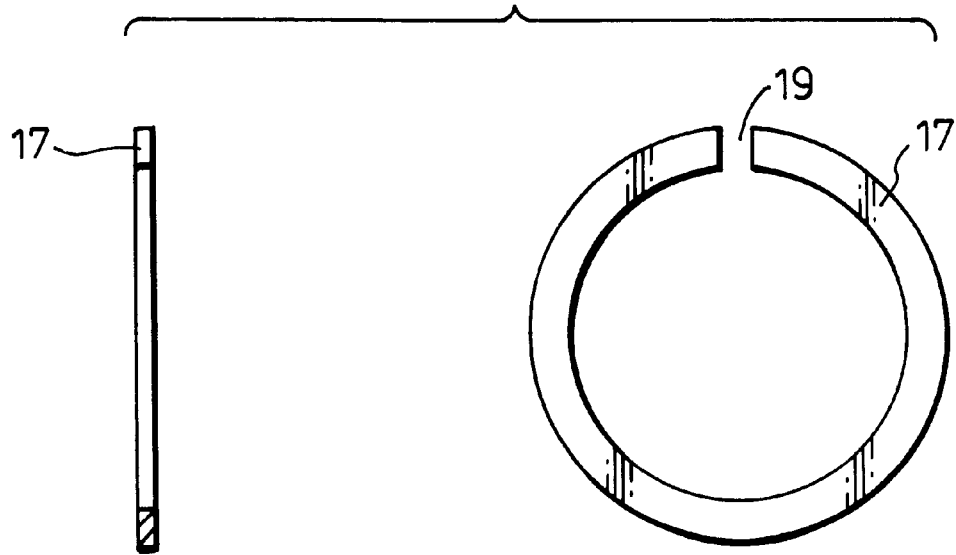

FIG. 2a shows a pressure member 9 which is similar to that shown in FIG. 1, except that this pressure member has a groove 15 in its outer lateral periphery. This groove 15 is for receiving a retaining member 17, as shown in FIG. 2b. The pressure member 9, and the groove 15, are generally circular, and the retaining member 17 comprises a substantially circular split ring which has at least approximately the same internal radius as the radius of the bottom of the groove 15.

The retaining member 17 has a slit 19 which has a width which is at least approximately the same as the width of the slots 11 in the pressure member 9. In use, when the retaining member 17 is located in the groove 15 in the pressure member 9, one or more elongate articles may be inserted into a slot 11 in the pressure member and retained in it by the retaining member, by sliding (rotating) the retaining member around the pressure member (in the groove 15) until the slit 19 is in alignment with the open end of the slot 11, by then passing the elongate article sideways through the slit 19 and inserting it into the slot 11, and then sliding (rotating) the retaining member so that the slit 19 is no longer in alignment with the slot 11. This operation may be repeated as many times as necessary (i.e. depending upon how many elongate articles need to be retained in the slots 11).

Figure 3A:
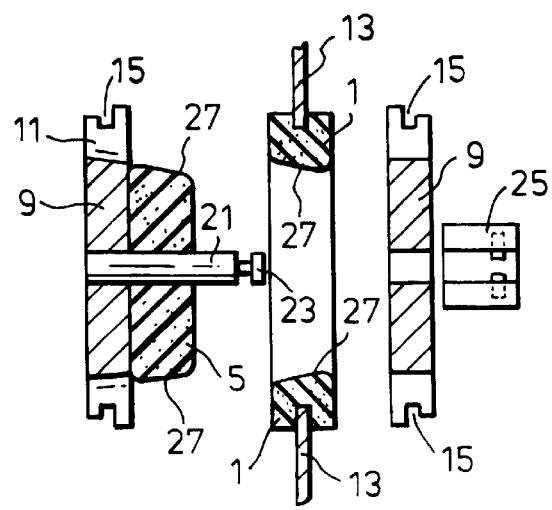
FIG. 3 shows two types of seal according to the invention in the process of being installed in an aperture.
Figure 3B:
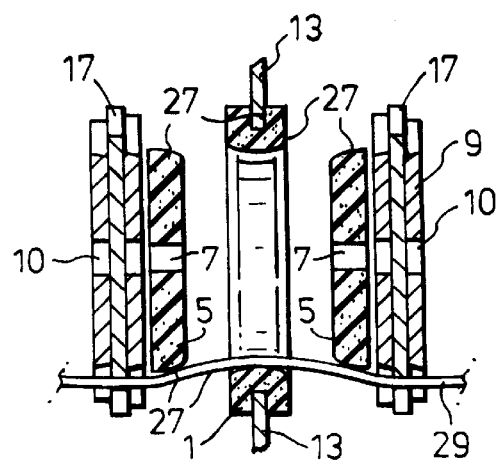

FIGS. 3a and 3b illustrate, schematically, two slightly different types of seal according to the invention in the process of being installed in an aperture in a wall 13 of an object. In both views, the annular outer seal member 1 is located in the periphery of the aperture, and the two pressure members 9 are about to be attached to each other on either side of the aperture. In FIG. 3a, a single inner seal member 5 is pre-attached to the inwardly-facing surface of one of the pressure members, whereas in FIG. 3b there are two inner seal members 5, each of which is attached to the inwardly-facing surface of a respective pressure member 5, and which, when the pressure members are connected together, come together inside the outer seal member 1. In FIG. 3b the connection member is not shown, but in FIG. 3a it is shown as an elongate member 21 which is attached to, or integral with, one of the pressure members, and which has an end part 23 which can interlock with a part 25 situated on the opposite side of the other pressure member.

In both FIGS. 3a and 3b, the outer seal members 1 and the inner seal members 5 have cooperating bevelled lateral peripheral edges 27. These cooperating bevelled edges help the inner and outer seal members to be forced into a sealing contact with each other when the pressure members are moved closer together. The seal members thus act like wedges. The internal lateral peripheral edge of the outer seal member 1 shown in FIG. 3a is bevelled from only one side, to cooperate with the single inner seal member 5, whereas the internal lateral peripheral edge of the outer seal member 1 shown in FIG. 3b is bevelled from both (opposite) sides, to cooperate with the two inner seal members 5.

In FIG. 3b, an elongate article 29 extending through the aperture, is illustrated schematically. This elongate article may, for example, be a "ruggedized" optical fibre (i.e. an optical fibre carried in a rugged outer jacket) such as a pigtail or a patch cord. It can be seen that the elongate article 29 extends between the inner seal members 5 and the outer seal member 1. When the seal members are compressed by bringing the two pressure members 9 closer together, the inner and outer seal members form a sealing contact with each other and with the elongate article 29 extending between them. There are no holes between the seal members which need to be blocked by plugs or pins etc.

Figure 4:
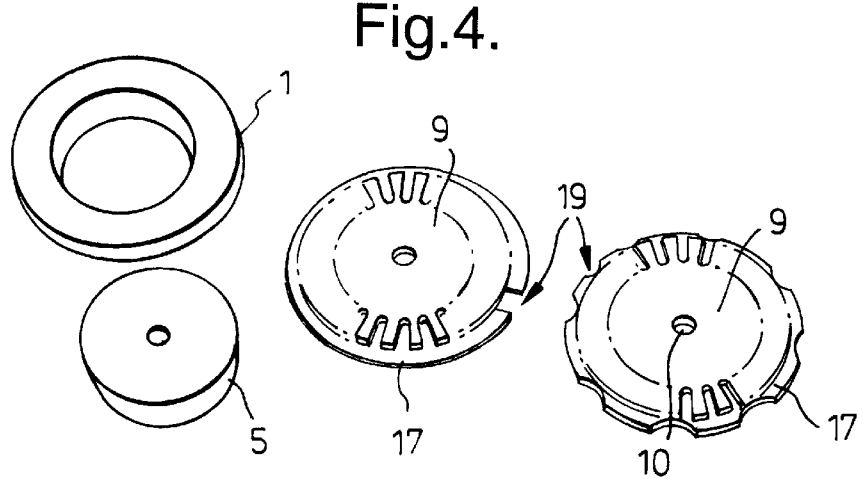
FIG. 4 shows the seal members, pressure members, and retaining members of a preferred type of seal according to the invention.

FIG. 4 shows the two pressure members 9, with retaining members 17 attached thereto, and the inner and outer seal members 5 and 1, of a preferred seal according to the invention. The installation of this seal in an aperture is illustrated in FIGS. 5a to 5d.

Figure 5A:
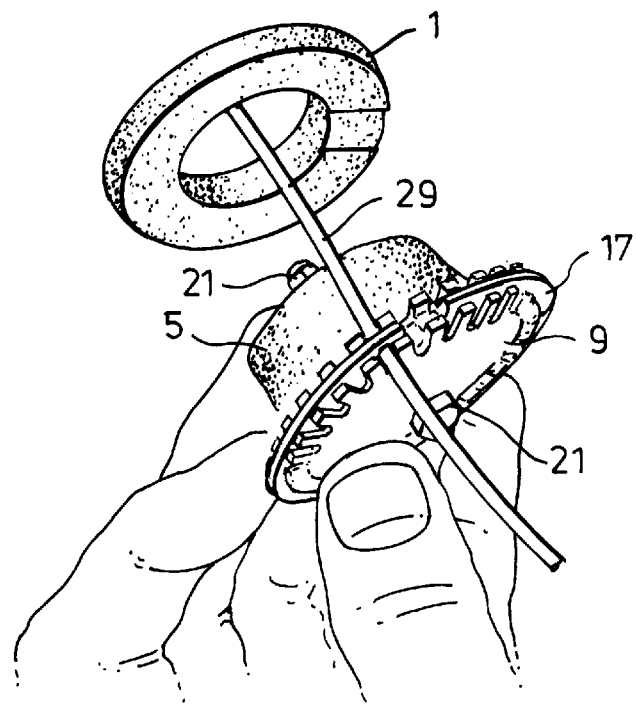
FIG. 5 is a series of four views showing the seal of FIG. 4 being installed in an aperture.
Figure 5B:
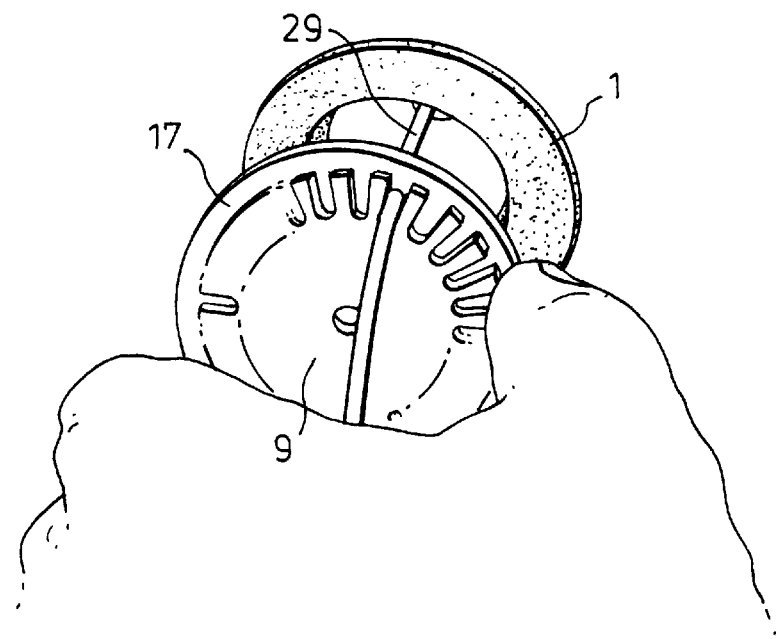
Figure 5C:
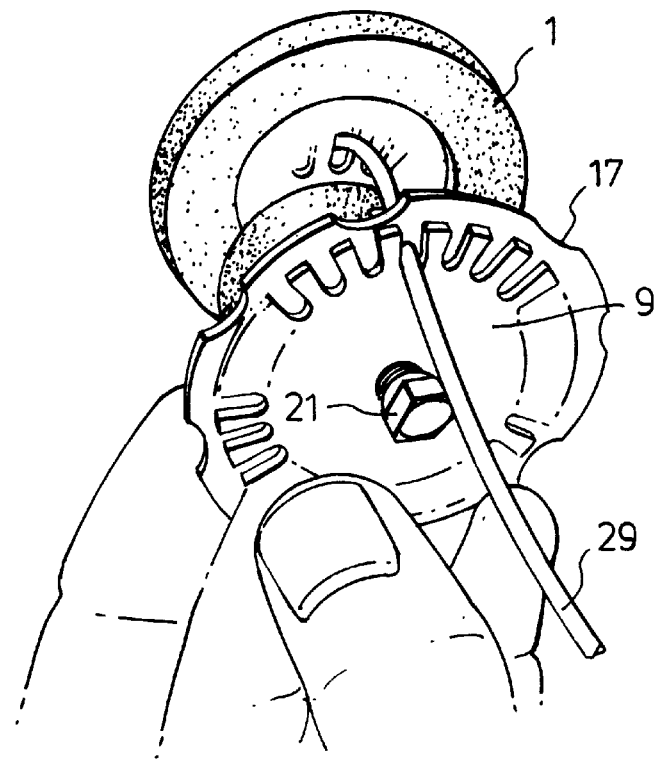
Figure 5D:
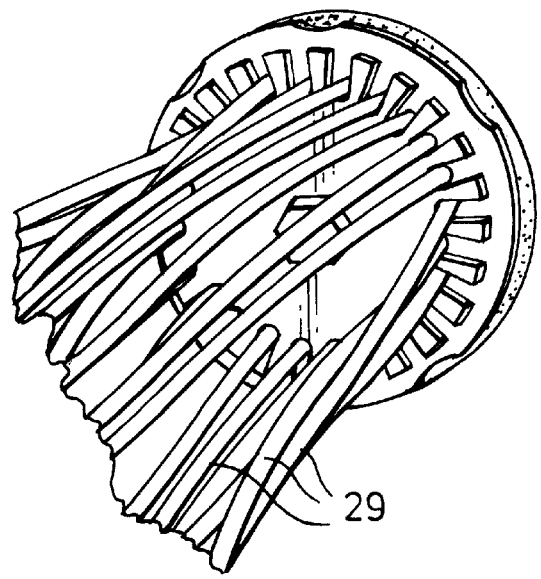

In FIG. 5a, the outer seal member 1 has been inserted into the aperture, and an elongate article 29 (a ruggedized optical fibre) extending through the aperture has been inserted into a slot 11 in one of the pressure members 9. The inner seal member 5 is carried on a compression means in the form of an axial elongate screw-threaded connecting member 21. FIG. 5b shows the elongate article 29 located in a slot 11 in the other pressure member 9 on the opposite side of the aperture. In FIG. 5c the two pressure members are about to be connected together, to compress the seal members between them. FIG. 5d shows the seal installed in the aperture, with twenty-four elongate articles 29 extending through the aperture and the seal. The seal members illustrated in FIGS. 4 and 5 are formed from silicone foam.

FIG. 6 is a cross-sectional view of another type of seal according to the invention. In this seal, the compression means comprises two housing parts: a main tubular part 31 and a tubular end part 33. The main tubular part 31 maybe placed in an aperture to be sealed. Preferably an end 35 of the main tubular part 31 is secured in the aperture, such that the rest of the main tubular part extends from the aperture. The tubular end part 33 is moveable, and securable, with respect to the main tubular part 31 by means of bayonet fittings 37. Securing the tubular end part 33 to the main tubular part 31 causes the two disc-shaped pressure members 9 to be moved closer together, thereby causing the seal members 1, 5 to be compressed.

FIG. 7 shows four views of the tubular end part 33 of the seal shown in FIG. 6. The end part is hinged at 39 so that it may be opened out (it is therefore "wraparound"). The end part may be closed by means of interlocking parts 41 and 43.

What is claimed is:

1. A seal for sealing an aperture in an object, at least one elongate article extending through the aperture, comprising:
   (a) at least two pressure members;
   (b) at least two seal members to seal the aperture, at least part of at least one of said at least two seal members being situated, in use, between said at least two pressure members; and
   (c) compression means to compress said at least two seal members in use by moving said at least two pressure members closer together so that the seal is arranged such that, in use, the at least one elongate article extends in between said at least two seal members, said at least two seal members being situated adjacent to each other in a lateral direction with respect to the direction in which the at least one elongate article extends, and being arranged to form a sealing contact with each other and with the at least one elongate article when compressed by the compression means.

2. A seal according to claim 1, in which the at least two seal members comprise:
   (i) at least one outer seal member which, in use, is situated in a periphery of the aperture to form a sealing contact with the object; and
   (ii) at least one inner seal member which, in use, is situated laterally within the at least one outer seal member.

3. A seal according to claim 2, in which the at least one outer seal member is in a shape of a substantially circular or oval ring.

4. A seal according to claim 2, in which the at least one inner seal member comprises at least two inner seal members, each of which is attached to a respective one of the at least two pressure members.

5. A seal according to claim 2, in which the at least one inner seal member has a substantially circular or oval lateral periphery.

6. A seal according to claim 5, in which an internal diameter of the at least one outer seal member is at least as great as, and no more than 5 mm greater than, an external diameter of the at least one inner seal member, when the at least two seal members are in a relaxed, undeformed, state.

7. A seal according to claim 1, in which the at least outer seal member has at least one groove in an external lateral periphery thereof, to locate the at least one outer seal member in the aperture.

8. A seal according to claim 1, in which at least one of said at least two pressure members has at least one opening therein, through which, in use, the at least one elongate article extends.

9. A seal according to claim 8, in which the at least one opening comprises at least one slot into which, in use, the at least one elongate article is inserted, whereby the at least one slot is open to, and extends from, an outer lateral periphery of the at least one of the at least two pressure members.

10. A seal according to claim 9, in which at least one said at least two pressure members further comprises a retaining member which is attachable to the outer lateral periphery of the at least one of said at least two pressure members to close the at least one slot and thereby to retain the at least one elongate article inserted into the at least one slot.

11. A seal according to claim 1, in which the compression means comprises at least two housing parts which, in use, at least partly surround the seal, and which may be moved and secured with respect to each other such that the at least two pressure members are moved closer together and the at least two seal members are thereby compressed.

12. A seal according to claim 11, in which the at least two housing parts are moved and secured with respect to each other by mutually engaging screw threads, or by a bayonet fitting, on the housing parts.

13. A seal for sealing an aperture in an object, through which aperture at least one elongate article extends, comprising:
    (a) at least two pressure members, at least one of the at least two pressure members containing at least one slot into which, in use, the at least one elongate article is inserted, the at least one slot being open to, and extending from, an outer lateral periphery of the at least one of the at least two pressure members;
    (b) at least one seal member to seal the aperture, at least part of the at least one seal member being situated, in use, between at said least two pressure members;
    (c) compression means to compress the at least one seal member in use by moving said at least two pressure members closer together; and
    (d) at least one retaining member which is attachable to the outer lateral periphery of said at least one of the at least two pressure members containing the at least one slot, to close the at least one slot and thereby to retain the at least one elongate article inserted into the at least one slot.

14. A seal according to claim 13, in which each of said at least two pressure members has a substantially circular outer lateral periphery, and the at least one retaining member has a substantially circular inner lateral periphery.

15. A seal according to claim 14, in which the at least one retaining member is slidably attachable to a respective one of the at least two pressure members, such as to slide around at least part of the outer lateral periphery thereof.

16. A seal according to claim 15, wherein the at least one slot comprises a plurality of slots; and in which the at least one retaining member includes a slit, through which, in use, the at least one elongate article is passed in order to insert the at least one elongate article into the at least one slot in the at least one of the at least two pressure members to which the at least one retaining member is attached, the at least one retaining member being slidable with respect to the at least one of the at least two pressure member such that the slit is positioned adjacent to each of the plurality of slots in turn, thereby to allow a plurality of insertions in turn.

17. A seal according to claim 14, in which the at least one retaining member has a substantially annular shape.

18. A seal according to claim 13, in which the at least one retaining member is attachable to a respective one of the at least two pressure members by location in at least one groove in at least one protrusion on, the outer later periphery of the one of the at least two pressure members.

19. A seal according to claim 13, in which, in use, the at least one retaining member contributes to the compression of at least one outer seal member, by acting as a lateral extension of the at least one of the at least two pressure members to which the at least one retaining member is attached.

20. A seal according to claim 13, in which the compression means comprises at least one connecting member which extends between, and interconnects, the at least two pressure members.

21. A seal according to claim 20, in which the compression means comprises a single axially central connecting member.

22. A seal according to claim 13, in which the compression means comprises at least two housing parts which, in use, at least partly surround the seal, and which may be moved and secured with respect to each other such that the at least two pressure members are moved closer together and the at least one seal member is thereby compressed.

23. A seal according to claim 22, in which the at least two housing parts are moved and secured with respect to each other by mutually engaging screw threads, or by a bayonet fitting, on the housing parts.

24. A combination of a splice closure container and at least one seal for sealing an aperture of the splice closure container, at least one cable extending through the aperture, the seal comprising:
    (a) at least two pressure members;
    (b) at least two seal members to seal the aperture, at least part of at least one of the at least two seal members being situated, in use, between said at least two pressure members; and
    (c) compression means to compress the at least two seal members in use by moving said at least two pressure members closer together so that the seal is arranged such that, in use, the at least one cable extends in between said at least two seal members, the at least two seal members being situated adjacent to each other in a lateral direction with respect to the direction in which the at least one cable extends, and being arranged to form a sealing contact with each other and with the at least one cable when compressed by the compression means.

25. A seal according to claim 24, in which the at least two seal members comprise:
    (i) at least one outer seal member which, in use, is sealing contact with the splice closure container; and
    (ii) at least one inner seal member which, in use, is situated laterally within the at least one outer seal member.

26. A seal according to claim 25, in which the at least one outer seal member is in the shape of a substantially circular or oval ring.

27. A seal according to claim 26, in which the at least one inner seal member has a substantially circular or oval lateral periphery.

28. A seal according to claim 27, in which an internal diameter of the at least one outer seal member is at least as great as, and no more than 5 mm greater than, an external diameter of the at least one inner seal member, when the at least two seal members are in a relaxed, undeformed, state.

29. A seal according to claim 25, in which the at least one outer seal member has at least one groove in an external lateral periphery thereof, to locate the at least one outer seal member in the aperture.

30. A seal according to claim 25, in which the at least one inner seal member comprises at least two inner seal members, each of which is attached to a respective one of the at least two pressure members.

31. A seal according to claim 24, in which at least one of the at least two pressure members has at least one opening therein, through which, in use, the at least one cable extends.

32. A seal according to claim 31, in which the at least one opening comprises at least one slot into which, in use, the at least one cable is inserted, whereby the at least one slot is open to, and extends from, an outer lateral periphery of the at least one of the at least two pressure members.

33. A seal according to claim 32, in which the at least one of said at least two pressure members further comprises a retaining member which is attachable to the outer lateral periphery of the at least one of the at least two pressure members to close the at least one slot and thereby to retain the at least one cable inserted into the at least one slot.

34. A method of sealing an aperture in an object, at least one elongate article extending through the aperture, using a seal comprising at least two pressure members, at least two seal members to seal the aperture, at least part of at least one of the at least two seal members being situated, in use, between said at least two pressure members, and compression means to compress the at least two seal members in use by moving said at least two pressure members closer together, at least one of the at least two pressure members having at least one slot therein, through which, in use, the at least one elongate article extends, and wherein the at least one slot is open to, and extends from, an outer lateral periphery of the at least one of the at least two pressure members, the method comprising the steps of:

(a) inserting the at least one elongate article into the at least one slot in the at least one of the at least two pressure members;

(b) inserting the at least two seal members in the aperture; and (c) compressing the at least two seal members between the at least two pressure members by moving the at least two pressure members closer together via the compression means.

35. A method according to claim 34, in which the at least one of said at least two pressure members further comprises a retaining member which is attachable to an outer lateral periphery of the at least one of the at least two pressure members to close the at least one slot and thereby to retain the at least one elongate article inserted into the at least one slot; and further comprising retaining the at least one elongate article in the at least one slot by attaching said retaining member to the outer lateral periphery of the at least one of the at least two pressure members.

36. A method according to claim 35, in which the retaining member includes a slit, and the retaining member is slidable with respect to the at least one of the at least two pressure members; in which step (a) comprises positioning the slit of the retaining member adjacent to the at least one slot, passing the at least one elongate article through the slit and inserting it into the at least one slot, and sliding the retaining member with respect to the at least one of the at least two pressure members in order to move the slit away from the at least one slot.

37. A method according to claim 36, in which the at least one elongate article comprises a plurality of elongate articles being inserted and retained in the at least two pressure members; and further comprising repeating step (a) for each elongate article in turn.

* * * * *